United States Patent [19]
McConnell et al.

[11] 3,840,220
[45] Oct. 8, 1974

[54] HYDRO-PNEUMATIC COUNTERBALANCE

[75] Inventors: David P. McConnell, P.O. Box 591, Minden, Nev. 89423; Louis E. Tully, La Canada, Calif.

[73] Assignee: said McConnell, by said Tully

[22] Filed: June 29, 1973

[21] Appl. No.: 375,175

[52] U.S. Cl.................. 267/69, 188/315, 267/64 R
[51] Int. Cl.............................................. E05f 3/04
[58] Field of Search............ 267/69, 70, 64 R, 64 B, 267/65 D; 187/62; 188/319, 322, 315

[56] References Cited
UNITED STATES PATENTS

| | | | |
|---|---|---|---|
| 1,957,308 | 5/1934 | Anderson................ | 267/64 R X |
| 2,148,839 | 2/1939 | Rossman et al................ | 188/319 |
| 2,233,226 | 2/1941 | Ramey................ | 267/64 R X |
| 2,240,644 | 5/1941 | Focht................ | 267/64 R X |
| 2,335,907 | 12/1943 | Boor et al................ | 188/319 |
| 2,394,355 | 2/1946 | Beecher................ | 188/319 X |
| 2,823,915 | 2/1958 | De Carbon................ | 267/64 R X |
| 2,850,276 | 9/1958 | Jackson................ | 267/64 R |
| 3,165,176 | 1/1965 | Arner................ | 267/64 R X |

Primary Examiner—Drayton E. Hoffman
Assistant Examiner—H. S. Lane
Attorney, Agent, or Firm—Paul A. Weilein

[57] ABSTRACT

An inner cylinder has a counterbalance piston under hyraulic pressure and an outer concentric cylinder contains highly pressurized gaseous fluid which provides the pressure. Communication between the two cylinders is controlled by an internal needle valve which may be adjusted by rotation of the piston rod. The counterbalance force is determined by the pressure of the gaseous fluid in the outer cylinder and the rate at which the piston moves under the pressure is determined by the adjustment of the needle valve.

17 Claims, 6 Drawing Figures

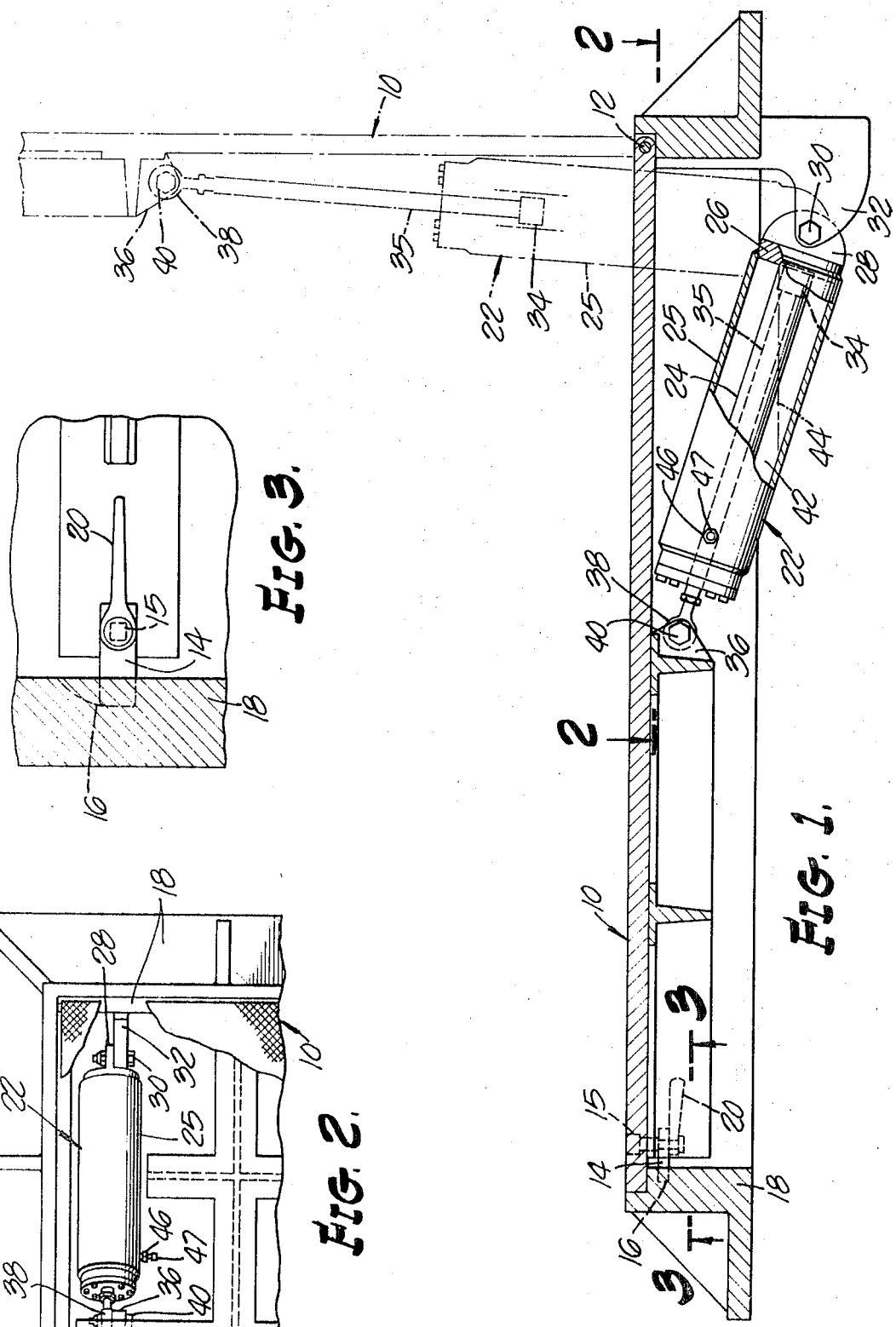

HYDRO-PNEUMATIC COUNTERBALANCE

BACKGROUND OF THE INVENTION

While the basic invention has wide application in various fields where stored energy is needed for counterbalancing and like purposes, the initial embodiment of the invention serves to counterbalance a trap door of several hundred pounds weight. Such doors commonly support traffic on streets and sidewalks and serve to protect access to lower levels. Heavy trap doors are also used for personnel hatches and for smoke hatches in the upper stories of buildings.

Coil springs are commonly employed to counterbalance doors and are satisfactory for relatively light doors such as garage doors. Counterbalance springs are prone to deterioration and occasionally break, but failure of a counterbalance for a door that is light enough to be readily opened by manual effort is not serious. On the other hand, where a force of several hundred pounds is required to open a massive trap door, failure of a counterbalance for the door can result in trapping personnel in an emergency such as a fire.

It is apparent that there is need for a heavy duty door counterbalance that is thoroughly reliable and functions efficiently after a long idle period.

SUMMARY OF THE INVENTION

An object of the invention is to avoid the use of springs to store energy. This object is attained by a hydro-pneumatic device in which the counterbalance force is transmitted hydraulically to a counterbalance piston and the required pressure source is a confined body of compressed gaseous fluid. The hydraulic fluid may be a stable oil such as chlorophenyl silicone oil and the gaseous fluid is preferably nitrogen gas.

Another object of the invention is to provide such a device that is flexible in the sense of being readily adjustable both with respect to the magnitude of the counterbalance force and with respect to the rate at which the counterbalance force is released. For this purpose provision is made for charging the device with nitrogen gas at any desired pressure and a suitable adjustment valve is provided to regulate the flow of the hydraulic fluid to the piston.

A further object of the invention is to provide a compact self-contained hydro-pneumatic counterbalance device. Compactness is achieved by employing two concentric cylinders wherein the inner cylinder is a hydraulic cylinder equipped with a suitable piston and the outer cylinder forms an annular storage space around the inner cylinder which annular space contains the nitrogen gas and a variable portion of the hydraulic fluid.

A still further object of the invention is to provide such a self-contained unit that is equipped with a manually adjustable rate-controlling hydraulic valve with effective safeguard against leakage from the valve to the exterior of the device itself as well as effective safeguard against leakage attributable to the means for manual adjustment of the valve. In this regard, a feature of the invention is that the valve itself is completely isolated from the exterior of the device and a related feature is that the valve is adjusted by rotation of the piston with the piston itself serving as means to seal off the adjustment mechanism from the atmosphere.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a view partly in side elevation and partly in section showing the presently preferred embodiment of the counterbalancing unit in use with a heavy steel trap door;

FIG. 2 is a horizontal sectional view along the line 2—2 of FIG. 1 showing the counterbalance unit as seen from above;

FIG. 3 is a fragmentary horizontal section taken as indicated by the line 3—3 of FIG. 1 showing the door latch as viewed from below;

DESCRIPTION OF THE PREFERRED EMBODIMENT OF THE INVENTION

Figure 4:
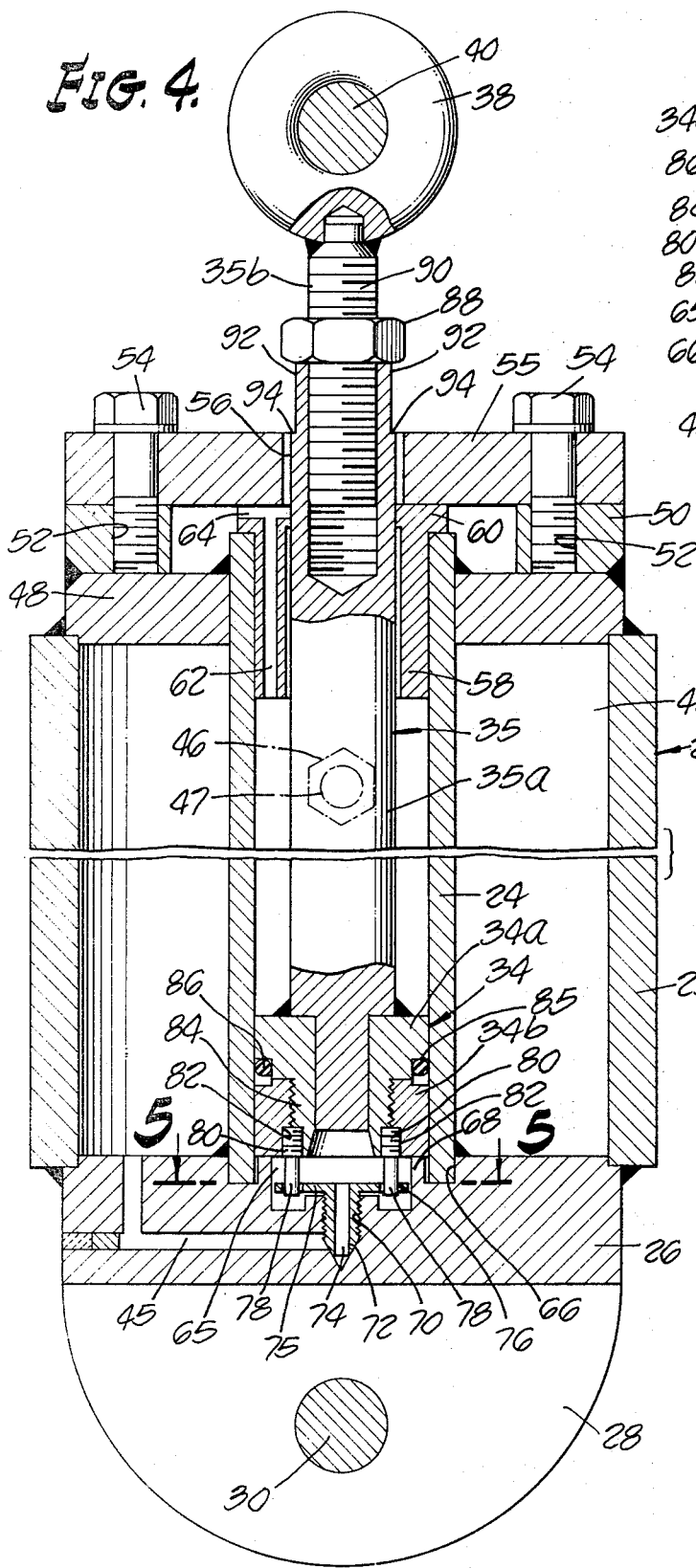
FIG. 4 is an enlarged broken sectional view showing details of construction of the counterbalance unit.
Figure 6:
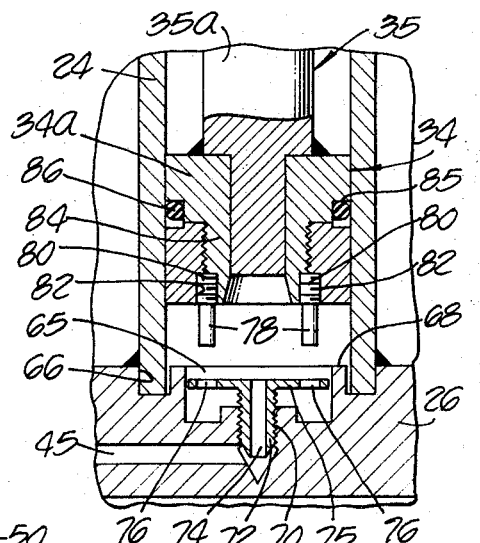
FIG. 6 is a fragmentary section similar to FIG. 4 showing the adjustment valve set for a given rate of operation of the counterbalance unit.
Figure 5:
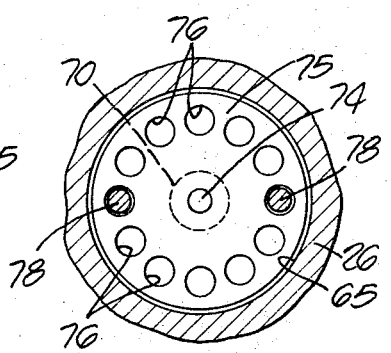
FIG. 5 is a fragmentary sectional view as seen along the line 5—5 of FIG. 4 showing the adjustment valve closed.

Referring first to FIG. 1, a heavy steel trap door 10 is mounted on a hinge 12 to swing between a horizontal closed position shown in solid lines and an upright open position shown in dotted lines. A suitable latch 14 is mounted on a pivot bolt 15 to swing between a release position and an effective position at which the latch member engages a recess 16 in fixed structure 18 below the door. The latch 14 is unitary with a handle 20 by means of which the latch may be operated manually.

A counterbalance unit, generally designated 22, embodying the present invention has an inner cylinder 24 and a concentric outer cylinder 25 and the bottom wall 26 of the outer cylinder has an ear 28 to receive a bolt 30 equipped with a nut and lock nut for pivotally connecting the lower end of the counterbalance unit to an ear 32 of the fixed structure 18. The inner cylinder 24 is provided with a piston 34 on the end of a piston rod 35 that extends from the piston through the upper end of the inner cylinder for pivotal connection to an ear 36 on the lower inner side of the door 10. The outer end of the piston rod 35 is formed with an eye 38 to journal a bolt 40 that is equipped with a nut and lock nut for mounting in the ear 36.

The inner and outer cylinders 24, 25 form an annular reservoir 42 which is partly filled with a body 44 of a suitable hydraulic liquid, the rest of the reservoir being occupied by a suitably compressed gaseous fluid such as nitrogen. The counterbalance unit swings between a lower position shown in full lines in FIG. 1 and an upright position shown in dotted lines nd and is important to note that at its lower position the counterbalance unit is suitably inclined to insure that the surface of the hydraulic fluid is above the lower end of the inner cylinder 24. As shown in FIG. 4 an angular passage 45 provides flow communication between the annular reservoir 42 and the lower end of the inner cylinder 24 and the inclination of the counterbalance unit insures that the angular passage is filled with the hydraulic liquid at all times so that only the hydraulic liquid acts on the lower face of the piston 34.

To provide for the introduction of nitrogen gas under suitable pressure into the annular reservoir 42, the upper portion of the outer cylinder 25 is provided with a suitable fill valve 46 which may be a Schrader valve No. 645H-5 equipped with a removable fluid-tight cap 47. Such a filler valve is of the character of a check valve which closes when released. In the preferred practice of the invention, the effective area of the piston 34 is one square inch so that the counterbalance force exerted by the piston is equal to the psi of the confined nitrogen. After the annular reservoir 42 is charged with nitrogen to the desired pressure, the cap 47 is tightened onto the protruding outer end of the filler valve as a safeguard against subsequent leakage.

Referring to FIG. 4 for details of the construction of the counterbalance unit 22, the upper ends of the inner and outer cylinders 24, 25 are interconnected by a ring-shaped wall 48 that is welded to both cylinders as indicated. A spacer ring 50 which is welded to the ring-shaped wall 48 as shown has a series of circumferentially spaced threaded bores 52 for engagement by corresponding cap screws 54 to retain a removable cover plate 55. The cover plate has a central aperture which provides a liberal clearance space 56 around the piston rod 35.

Telescoped into the upper end of the inner cylinder 24 is a guide bushing 58 for the piston rod 35, which guide bushing has a radial flange 60 that is clamped between the upper end of the inner cylinder 24 and the cover plate 55. The guide bushing 58 has a longitudinal bore 62 which intersects a radial groove 64 in the upper end of the guide bushing for venting the inner cylinder 24 above the piston 34 to the atmosphere through the clearance space 56.

The bottom wall 26 of the device has a central recess 65 in communication with the lower end of the inner cylinder 24 and the lower end of the inner cylinder seats in a circular groove 66 which defines with the central recess an upstanding cylindrical flange 68 against which the piston 34 may bottom as shown in FIG. 4. The central recess 65 of the bottom wall 26 communicates with a blind axial bore 70 which is threaded for engagement by a needle valve 72, the needle valve being formed with an axial bore 74. The lower end of the blind axial bore 70 is tapered to form a valve seat and the nose of the needle valve 72 is correspondingly tapered to close against the valve seat in a fluid-tight manner. The previously mentioned angular passage 45 that communicates with the annular reservoir 42 terminates at the tapered valve seat as shown in FIG. 4 so that tightening of the needle valve cuts off communication between the annular reservoir and the lower face of the piston 34. The screw thread of the needle valve 70 may have twenty turns per inch to provide suitable graduated control of flow through the angular passage 45.

To provide for operation of the needle valve 70 by rotation of the piston 34, the needle valve is formed with a radial flange 75 at its upper end and the radial flange is formed with a circumferential series of equally spaced recesses in the form of bores 76 for cooperation with a pair of diametrically opposite adjusting pins 78 that protrude downwardly from the leading face of the piston. Each of the adjusting pins 78 has an enlarged screw threaded base 80 which threads into a corresponding bore 82 in the piston 34.

The piston 34 is made in two sections comprising an upper section 34a which is welded to the lower end of the piston rod 35 and a lower section 34b in the form of a collar that screw threadedly embraces a reduced lower portion 84 of the upper section. The piston 34 is formed with an outer circumferential groove 85 which confines an O-ring 86, the juncture between the two sections 34a and 34b of the piston being at the circumferential groove 85 below the O-ring 86.

The threaded bores 82 that receive the pair of adjusting pins 78 of the piston are formed in part in section 34a and in part in section 34b of the piston so that the adjusting pins 78 not only serve their primary purpose but also serve as means to lock the two sections of the piston against relative rotation. Since the threaded bores 82 communicate with the threaded joint between the two piston sections, fluid cannot be trapped in the bores to interfere with installation of the adjusting pins.

The piston rod 35 is also made in two separate sections comprising a lower section 35a and an upper section 35b which threads into the upper end of the lower section. A lock nut 88 engaging a screw thread 90 of the upper section 35b is normally jammed against the upper end of the lower section 35a to releasably lock the two piston rod sections against relative rotation. The lock nut 88 may be loosened to permit extension or retraction of the piston rod and to permit the lower section 35a of the piston rod to be rotated independently of the upper section 35b for the purpose of adjusting the needle valve 72.

The upper end of the lower section 35a of the piston rod is formed with two diametrically opposite flats 92 to receive a wrench for rotation of the lower piston rod section 35a as required for adjustment of the needle valve 72. The two flats 92 form corresponding diametrically opposite shoulders 94 and a feature of the invention is that these two shoulders 94 are flush with the upper face of the cover plate 55 when the piston 34 bottoms against the cylindrical flange 68 of the bottom wall 26. Thus, the diametrically opposite shoulders 94 of the piston rod and the upper face of the cover plate 55 serve as index means to indicate when the piston 34 is bottomed.

With the lock nut 88 loosened, a wrench may be applied to the flats 92 of the lower piston rod section 35a for the purpose of rotating the piston 34 for adjustment of the needle valve 72. Thus, the rate of flow of the hydraulic fluid through the angular passage 45 between the annular reservoir 42 and the lower face of the piston 34 may be adjusted at any time to vary the rate at which the hydraulic fluid moves the piston. It is to be noted that both the needle valve and the means for releasably connecting the needle valve to the piston are sealed off from the exterior of the unit by the piston itself.

It is apparent that when the counterbalance unit 22 is fabricated at the factory it may be charged with nitrogen gas at a selected pressure and it is further apparent that the needle valve may be adjusted at that time for a desired rate of movement of the piston. An advantage of the described construction of the counterbalance unit, however, is that it permits introduction of the compressed nitrogen to be delayed until the time of installation of the counterbalance device and also permits adjustment of the needle valve 72 to be delayed until the time of installation of the device.

If the counterbalance unit is shipped from the factory without nitrogen gas content but with the proper content of hydraulic liquid and with the needle valve closed, the instructions for installing the counterbalance unit on the door 10 of FIG. 1 are as follows:

1. With the door closed attach the ear 28 at the bottom of the unit to the ear 32 of the fixed structure 18 by means of the pivot bolt 30 with the pivot bolt suitably lubricated.

2. Hold the piston rod in a fixed position and loosen the lock nut 88. With the piston rod fully inserted and bottomed against the cylindrical flange 68 as indicated by the two shoulders 94 of the piston rod being flush with the upper face of the cover plate 55, adjust the piston rod eye 38 to align with the aperture in the ear 28 of the door and then install the pivot bolt 40 with the pivot bolt suitably lubricated. Then tighten the nuts and lock nuts on both of the pivot bolts 30 and 40 to permit movement of the door with minimum play.

3. With the piston bottomed in engagement with the needle valve, apply a wrench to the piston rod flats 92 to turn the lower section 35a of the piston rod four turns counterclockwise as the unit is viewed from its upper end. The four counterclockwise turns of the lower piston rod section provide a tentative rate of door operation. Then tighten the lock nut 88 while holding the lower piston rod section 35a against rotation.

4. Connect a highly pressurized valve-equipped nitrogen tank to the fill valve 46 through a suitable pressure gauge and charge the counterbalance unit with nitrogen gas to the desired pressure. If, for example, the door in FIG. 1 weighs 820 pounds, fill the unit with nitrogen gas to a pressure of approximately 700 psi to cause the door to start to lift slowly. Add enough pressure to the nitrogen gas to cause the counterbalance unit to fully open the door so that the door will open automatically when the latch 14 is released. Then disconnect the highly pressurized nitrogen gas tank and firmly install the valve cap 47 on the filler valve 46.

5. Apply the required manual force of approximately 40 to 70 pounds to close the door, with the rate of closing movemvent of the door determined by the setting of the needle valve.

6. Make a final adjustment of the needle valve as required to cause the door to open at a desired rate of operation. To carry out this adjustment close the door completely and loosen the lock nut 88 while holding the lower piston rod section 35a against rotation. Turn the lower piston rod section 35a counterclockwise if faster door operation is desired or turn the lower piston rod section clockwise to reduce the rate of door operation. Then tighten the lock nut 88 while holding the lower piston rod section 35a against rotation. The rate at which the door opens may then be checked and further adjustment of the needle valve by rotation of the lower piston rod section 35a may be carried out if necessary to arrive at the desired rate of door operation.

Since all adjustments of the needle valve 72 are carried out with the two adjusting pins 78 engaging the needle valve and since the lock nut 88 is tightened while the adjusting pins 78 are engaged with the needle valve, the adjusting pins maintain their alignment with the selected bores 76 of the needle valve throughout all movements of the piston away from the needle valve.

In accord with Boyle's law, the counterbalance force exerted by the unit 22 reduces as the volume of the confined nitrogen gas is expanded by extension of the piston rod. The rate at which the counterbalance force declines varies with the range of movement of the piston and the ratio between the effective cross-sectional area of the inner cylinder 24 and the cross-sectional area of the annular reservoir 42. At the same time the force required to open the door declines as the door swings towards its upright open position. It is apparent, then, that for a given door and a given stroke of the piston, the ratio between the two cross-sectional areas may be selected for a given effect. For example, the counterbalance force may be caused to drop off faster than the gravitational force that tends to close the door so that the door will seek a selected partially open position, only moderate manual force being required either to close the door or open the door wider from the selected partially open position.

In the above described installation procedure the counterbalance unit is adjusted to overbalance the door and thus bias the door towards its open position so that manual force is required to close the door. In some installations of the counterbalance unit, however, it may be desirable to underbalance the door, i.e., to provide a counterbalance force that is just under the force that is required to initiate opening movement of the door. In such an arrangement the door is biased to closed position but even though the door may weigh several hundred pounds the door may be readily opened by applying an initial manual force in the range of 40–70 pounds. The ratio between the two cross-sectional areas may be selected to cause the door to open wide automatically once the door is partially opened.

The description of the presently preferred embodiment of the invention in specific detail will suggest various changes, substitutions and other departures from the disclosure within the spirit and scope of the appended claims.

We claim:

1. In a device to exert force between two parts to counterbalance a load on one of the parts, the combination of:

an outer cylinder for connection to one of the two parts, said outer cylinder having an upper end and a lower end;

an inner cylinder inside the outer cylinder and forming therewith an annular space surrounding the inner cylinder, the upper end of the inner cylinder being in communication with the atmosphere, said annular space being sealed off from the atmosphere;

force transmitting means including a piston slidable in the inner cylinder and extending through the upper end of the inner cylinder for connection to the other of the two parts;

a body of liquid in the lower end of said annular space;

a pressurized body of gaseous fluid occupying the remainder of the annular space;

a passage for flow of liquid from the annular space to the inner cylinder to cause the pressure of the gaseous fluid to exert pressure on said piston to lift the piston against said load; and means to variably restrict the flow through said passage to adjust the rate at which the piston moves against the load.

2. A combination as set forth in claim 1 in which the means to variably restrict the flow through said passage is a valve member screw threaded for adjustment by rotation;

in which the piston is mounted on a piston rod that is manually rotatable from outside the inner cylinder for rotation of the piston;

and which includes means rigidly mounted on said piston for releasable engagement with said valve member when the piston is fully retracted whereby with the piston retracted the connecting rod may be rotated for rotational adjustment of the valve member.

3. A combination as set forth in claim 2 which includes index means to indicate when the piston is fully retracted.

4. A combination as set forth in claim 2 which includes means normally preventing rotation of the piston, said preventing means being releasable to permit adjustment of the valve means by rotation of the piston.

5. A combination as set forth in claim 1 in which one of said parts is a trap door;

and which includes a latch on the inner side of the door to releasably hold the door in closed position.

6. A combination as set forth in claim 5 in which said gaseous fluid is nitrogen.

7. In a device to at least partially counterbalance a load, the combination of:

a cylinder with an outer end of the cylinder in communication with the atmosphere;

pressure responsive means including a piston in the cylinder, said pressure-responsive means extending through the outer end of the cylinder, one of said cylinder and said pressure-responsive means being anchored, the other of said cylinder and said pressure-responsive means being connected to said load;

a passage from the inner end of the cylinder communicating with a source of pressurized fluid to permit the pressurized fluid to exert pressure on the piston; and valve means to control flow through said passage, the whole of said valve means being isolated from the atmosphere to preclude leakage therefrom to the atmosphere, said valve means being adjustable from the interior of the cylinder through the outer end of the cylinder.

8. A combination as set forth in claim 7 in which said load is a trap door;

in which the pressure of the pressurized gaseous fluid is of a magnitude to create a force on said piston that is greater than the initial resistance to opening movement of the door whereby the door is biased to open position;

and which includes a latch to hold the door closed so that releasing the latch causes the door to open.

9. A combination as set forth in claim 7 in which said load is a trap door;

and in which the pressure of the pressurized gaseous fluid is of a magnitude to create force on said piston less than the initial resistance to opening movement of the door whereby the door is biased to closed position.

10. A combination as set forth in claim 7 in which the effective area of the piston is one square inch whereby the force exerted by the piston is substantially equal to the psi of the pressurized gaseous fluid.

11. A combination as set forth in claim 7 in which the valve means is adjustable by rotation;

in which the piston is manually rotatable from outside of the inner cylinder;

and which includes means rigidly mounted on the piston to engage said valve means when the piston is fully retracted for rotation of the valve means by rotation of the piston.

12. A combination as set forth in claim 11 which includes means normally preventing rotation of the piston, said preventing means being releasable to permit adjustment of the valve means by rotation of the piston.

13. A combination as set forth in claim 11 which includes a piston rod extending from the piston through the outer end of the inner cylinder for connection to the other of said two parts, said piston rod being made in two sections that are rotatable relative to each other to permit rotation of the piston by one of the two sections;

and which includes releasable means to lock the two piston rod sections against relative rotation.

14. A combination as set forth in claim 13, in which said one of said two piston rod sections screws into the end of the other piston rod section;

and in which said one piston rod section is provided with a lock nut for tightening against said end of the other section to prevent relative rotation between the two piston rod sections.

15. A combination as set forth in claim 11 in which said valve means comprises a screw threaded needle valve.

16. A combination as set forth in claim 15 in which the screw threaded needle valve is located coaxially of the piston;

in which one of said piston and said needle valve has a concentric series of recesses;

and in which the other of said piston and said needle valve has means extending therefrom for releasable engagement with said recesses selectively to operatively connect the piston to the needle valve.

17. A combination as set forth in claim 16 in which said recesses are in the needle valve and are arranged in diametrically opposite pairs;

and in which the piston has a pair of diametrically opposite projections to engage said pairs of recesses selectively.

* * * * *